(12) United States Patent
Tormod

(10) Patent No.: US 6,226,084 B1
(45) Date of Patent: May 1, 2001

(54) CALIBRATION METHOD

(75) Inventor: Stig Tormod, Uppsala (SE)

(73) Assignee: Amersham Pharmacia Biotech AB, Uppsala (SE)

( * ) Notice: Subject to any disclaimer, the term of this patent is extended or adjusted under 35 U.S.C. 154(b) by 0 days.

(21) Appl. No.: 09/125,918

(22) PCT Filed: Feb. 26, 1997

(86) PCT No.: PCT/SE97/00330

§ 371 Date: Dec. 29, 1998

§ 102(e) Date: Dec. 29, 1998

(87) PCT Pub. No.: WO97/32187

PCT Pub. Date: Sep. 4, 1997

(30) Foreign Application Priority Data

Feb. 27, 1996 (SE) .................................................. 96 00747

(51) Int. Cl.[7] ........................................................ G01J 3/18

(52) U.S. Cl. ........................................... 356/328; 356/334

(58) Field of Search ..................................... 356/319, 326, 356/328, 331, 334

(56) References Cited

U.S. PATENT DOCUMENTS 4,565,447 * 1/1986 Nelson .................................. 356/319

* cited by examiner

*Primary Examiner*—F. L. Evans
(74) *Attorney, Agent, or Firm*—Royal N. Ronning, Jr.; Victoria M. Malia

(57) ABSTRACT

The invention relates to a method of calibrating an optical system, the system comprising a flash lamp as a light source (4), a lens system (6), a monochromator comprising a grating (10), a motor (20) for displacing the grating so as to enable scanning essentially monochromatic light over a detection system. The light source provides at least two high intensity peaks at distinct wavelengths. The method comprises scanning a first wavelength region comprising at least one of said at least two high intensity peaks, and measuring the intensities at a selected number of points during the scan. A first of said at least two peaks is coarsely located. A wavelength region around each of said at least two peaks is scanned, measuring the intensities at closer intervals than previously. At least two peaks are located by autocorrelation. The location of said peaks is determined in terms of a distance from a reference point, said distance corresponding to said displacement of the grating.

7 Claims, 2 Drawing Sheets

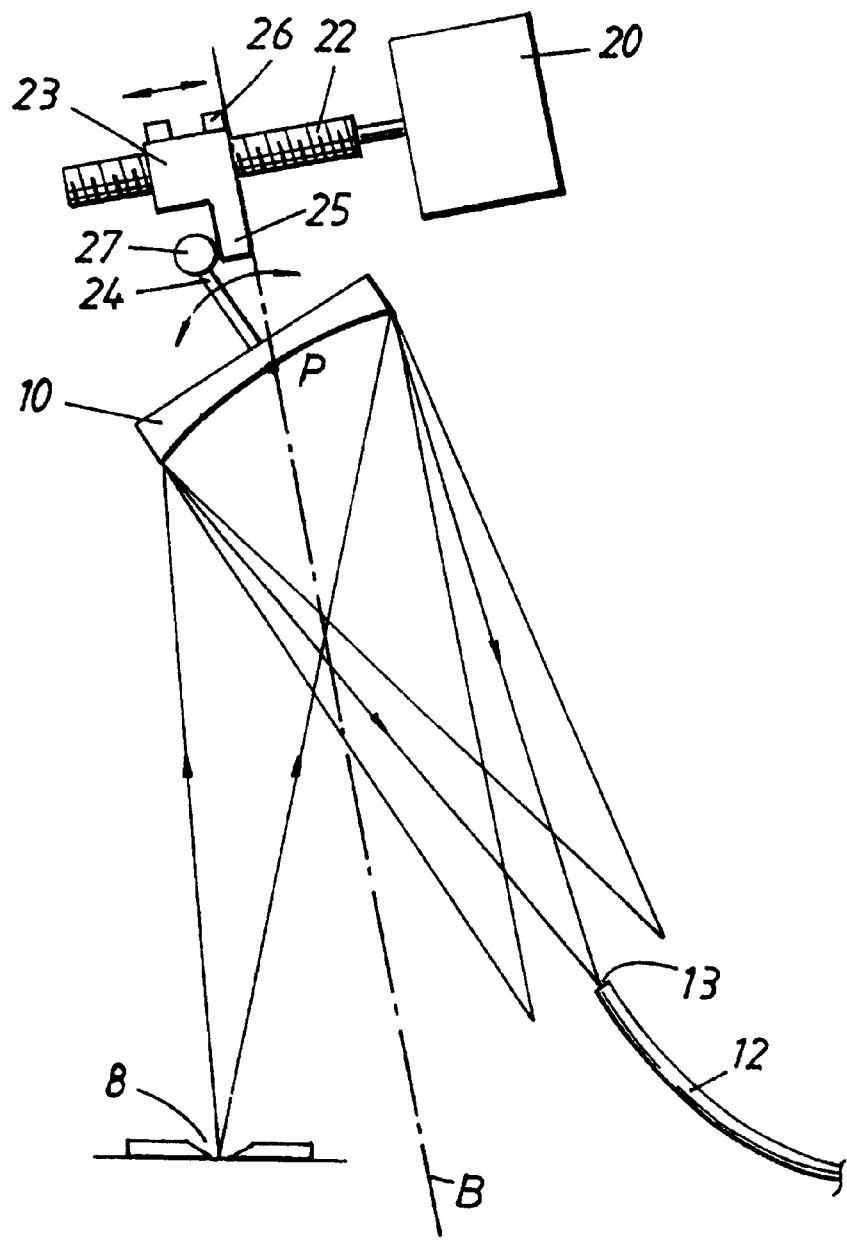

CALIBRATION METHOD

The present invention relates to a method of wavelength calibration of an optical system, and to selfdiagnosis of such a system comprising such calibration.

BACKGROUND OF THE INVENTION

Prior art spectrophotometer systems frequently make use of a deuterium lamp as a light source. The advantage of such a lamp is that it burns nicely in a continuous manner, and it has a couple of well defined wave length peaks. However, the intensity of a deuterium lamp is relatively low. In a liquid chromatographic system the small flow cells requires high intensity light in order to make adequate detection possible. Also the optical system comprising e.g. fibre optics require much more light than is delivered by a deuterium lamp. Wavelength calibration in such systems is performed by locating a single peak. This inevitably yields problems of accuracy at the short wave and long wave ends respectively of the wave length scale. It is also very important that a selected wave length be reproducible. The reproducibility reachable in calibration should be at least ±2 nm.

U.S. Pat. No. 5,212,537 is directed to a method of calibration for monochromators and spectrophotometers, using a continuous light source, a tungsten filament mercury vapour lamp, having two sharp intensity peaks. The location of the peaks is identified by measuring the width of said peaks at half height, and the midpoint of this width is taken as the location of the peak. This technique would not be possible to use in connection with a flash lamp, e.g. a Xenon lamp, since the intensity of the peaks fluctuates.

U.S. Pat. No. 5,268,737 is directed to calibration of a spectrophotometer. As the source of continuous light, a deuterium lamp and a tungsten lamp is used. A point of reference is determined by using zero order light. This would not be possible in connection with the use of optical fibres for transmission.

SUMMARY OF THE INVENTION

The object of the invention is to provide an improved calibration method for a spectrophotometer system, wherein the drawbacks of the prior art systems are remedied.

This object is achieved with the method of the present invention.

The advantage of the method as claimed is that by virtue of the high brightness of the flash lamp used in the method, the amount of light introduced in the system is increased, and that the accuracy in the calibration is ascertained over the entire wavelength region of interest.

BRIEF DESCRIPTION OF THE DRAWINGS

In the figures

FIG. 3 schematically shows the mechanism for rotating the grating.

DETAILED DESCRIPTION OF A PREFERRED EMBODIMENT OF THE INVENTION

Figure 1:
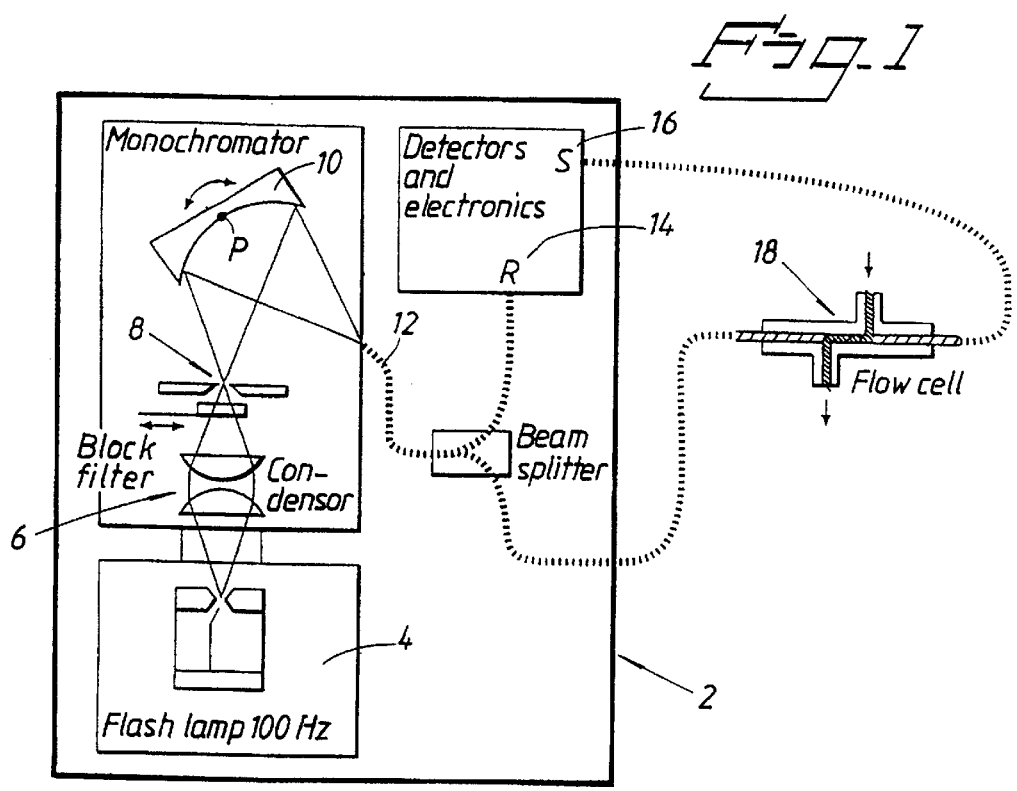
FIG. 1 is an overview of an optical system in which the invention may be implemented.

In FIG. 1 there is shown an overview of a UV-visible detection system, generally designated 2, wherein the calibration method of the invention is implemented.

Figure 2:
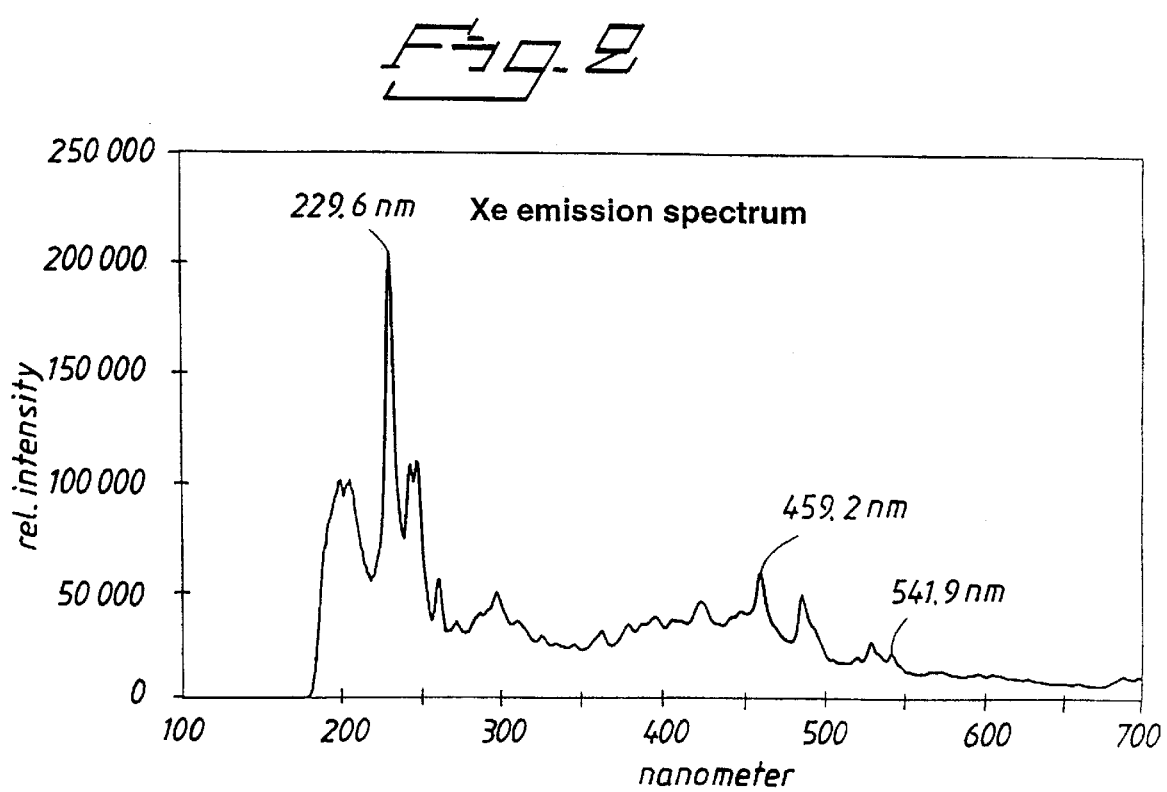
FIG. 2 is a spectrum for a Xenon flash lamp.

The system comprises a light source, e.g. a xenon flash lamp 4, having a typical emission spectrum as shown in FIG. 2. In a preferred embodiment the distance between electrodes in the lamp is approximately 1.5 mm. This yields a flash with very high brightness. The system further comprises lenses 6 that focus the light onto an entrance slit 8, a pivotal, concave aberration corrected holographic grating 10 that causes a diffraction of the light. The grating has preferably 1200 lines/mm for the applications in question, but may be selected by the skilled man to suit a particular application. An optical fibre 12 is arranged in the area where the light diffracted from the grating impinges, such that it is possible to select a wavelength of a certain narrow band width, for the purposes of the invention in principle monochromatic light, and to transfer light of said wavelength to the detection system. By rotating the grating 10 around a pivot point P it is possible to select any wavelength from about 190 nm up to 700 nm. Rotation of the grating 10 is achieved with a stepper motor 20 (see FIG. 3) operating a micrometer screw, schematically shown at 22. A nut means 23 running longitudinally on the screw 22 is provided with a protruding element 25 that displaces a rod or arm 24 provided with a ball 27, and secured to the grating 10. The mechanics is designed such that a linear displacement of the micrometer screw 22 yields a linear displacement of the wavelength of the light beam impinging on the optical fibre 12. It is important that the longitudinal axis of the screw 22 is perpendicular to the bisector B of the angle formed between the point of location of the entrance slit 8, the pivot point P and the point of location of the optical fibre end 13. This is a standard technical solution well known to the skilled man, and does not form part of the invention, and will thus not be discussed further herein.

Because the light source is a flash lamp, the light that is transferred into the fibre needs to be split in a reference beam R impinging on a reference detector 14, and a detection or sample beam S impinging on a sample detector 16. The intensity of light from the reference beam R impinging on the reference detector is designated I°. The intensity of light impinging on the sample detector is designated I. The sample beam enters a cell, e.g. a flow cell 18 through which samples are passed from a chromatographic column (not shown), ending up in a collection system (not shown) for collecting fractions of eluted material, and impinges on said sample detector 16 which detects the presence of sample in the flow cell 18 as a change in transmitted intensity I, and hence a change in absorbance A. Absorbance is defined in accordance with the well known equation $$A = -lg\frac{I}{I_o}$$

Absorbance A is proportional to concentration C, and path length 1 in the cell according to following equation $$A = \epsilon 1 C$$

wherein $\epsilon$ is the molar absorption coefficient.

Turning now to FIG. 2, the spectrum of the xenon lamp is shown. It is a continuous spectrum at the high currents employed during discharge, and apart from a very broad peak at approximately 200 nm, there are a couple of characteristic peaks, which are employed for calibration purposes. Thus the peak at 229.6 nm is used as one calibration wave length, and the peak at 541.9 nm as the other. These peaks are in the first order spectrum of the grating. For control purposes a third peak, namely the second order spectrum peak corresponding to 229.6 nm, i.e. 459.2 nm in the first order, is used.

Now the calibration procedure will be described.

The first step is to run through the span of the micrometer screw 22 between its end positions. The end positions are sensed by an optical sensing device detecting the presence or absence of mechanical "flags" 26 provided on the micrometer screw. This initial run is performed to condition the micrometer and lubricate it by distributing the oil. Also, jamming of any kind will be detected thereby, and if occurring, a message to that effect will be displayed to the operator, i.e. a calibration is not possible.

Secondly the wavelength field between approximately 100 and 352 nm will be scanned, and one value for each nm, corresponding to three steps of the stepper motor, is detected and stored in a data array. The highest value of these is identified, and is designated max. peak. The measurement is performed as follows: After having stepped to a position corresponding to 100 nm (i.e. a number of steps from the end position determined by the previously mentioned flag. This number of steps is approximately known from experience and is preset), the stepper motor rests for a period long enough for the detection system to detect 5 flashes from the xenon lamp. The lamp flashes continuously at a rate of 100 Hz, thus 5 flashes would require the stepper motor to rest 50 ms before it goes on. The intensities of said five flashes are added and stored as one entry in the data array. Of course the number of flashes detected need not be five, but in order to obtain a reasonable averaging of variations, five has been selected as a good compromise.

After detection of said five intensity values, the stepper motor steps three steps, corresponding to 1 nm in a few microseconds and then rests again for the system to detect five new intensity values, adding the same and storing them in the data array. This is repeated over the range 100 to 352 nm. Because of the system optics absorbs light in the UV region, the system will not "open" until around 190 nm, and thus the detectors will see no light until then.

After the scan is completed, the first detected intensity value above zero stored in the data array (i.e. a value at approximately 190 nm or so) is compared to the highest detected value. If said first value is less than 2% of highest value (max. peak) the system proceeds. If it is not, an indication to that effect will be displayed, signalling some kind of malfunction, normally defective optics. For example stray light could cause a background level above zero. The value 2% is arbitrarily selected as a reasonable measure that the optics is functioning properly. If the value is higher, there may be artefacts such as reflections from foreign particles etc. The 2% value is not critical and could in principle be as high as 20%. The value at the "2% point" is taken as the starting point for the next step of the method.

In the next step the system checks the intensity values in the data array in order to find the peak at 229.6 nm. However, the broad peek at approx. 200 nm mentioned above may in some instances, e.g. extremely high discharge currents, have a higher peak intensity than the peak at 229.6 nm, and therefore the system is programmed to step in the data array to values corresponding to a value located at 36 nm (108 steps) from the "2% point" in order to pass said broad peak.

By comparing the data set by autocorrelation against an ideal peak corresponding to a $y=x^2$ curve, the peak at 229.6 nm is located. Autocorrelation is a standard technique comprehensively described in the literature, and reference is e.g. made to a compendium "Tidsserieanalys" by Lennart Olbjer, University of Lund, for more details and alternative methods.

Thereafter the region between 225–235 nm is scanned again, now recording one set of measurements for each step of the stepper motor, each step corresponding to approximately 0.33 nm, in order to find the peak at 229.6 nm. Again autocorrelation, using the data in the data array starting at 225 nm, is used to find the exact location of the peak at 229.6 nm. The region 535–565 nm is scanned in the same way, in order to find the peak at 541.9 nm using the same autocorrelation method. Of course it is conceivable to scan the entire spectrum, but in order to save time scanning is restricted to two regions of the spectrum.

When the peaks have been established the intensity at 229.6 nm is checked to see whether it exceeds a selected minimum value or not.

If not, an error message will indicate "Low light intensity". This is an indication that the lamp should be replaced. The system also logs the time the lamp has been in use, and after a certain number of hours a message will be displayed saying that the lamp should be replaced.

The calibration constant is calculated. It is defined as the distance (counted in steps of the stepper motor) from the "flag" on the micrometer screw to the "knee" at the "2% point" on the intensity curve. The calibration constant is taken as an indication that the system is functioning properly if it is within certain predetermined limits. The dispersion is also calculated. Dispersion is defined as number of steps/nm, and is calculated as $$\text{dispersion} = \frac{\text{number of steps between calibration peaks}}{541.9 \text{ nm} - 229.6 \text{ nm}}$$

The dispersion varies from batch to batch of the gratings and depends on the tolerances of the mechanical system. Usable dispersions are 2,9–3,1 steps/nm.

In another aspect of the invention, there is provided a check of the calibration, i.e. a validation check to see if the calibration is still valid. Such a check may be necessary if the results of a chromatographic run for some reason seem to exhibit artefacts. Normally the system "flips" between three wavelengths during a run, and it may occasionally happen that the stepper motor jumps past a step, because of jamming on the micrometer screw etc. This will lead to a displacement of the calibration setting.

The calibration check is performed by running the calibration procedure again, but this time only calculating the deviation in the calibration constant and the dispersion established at the calibration. If there is a deviation the system will display a message to the operator, who then can decide to recalibrate.

In this process there is an extra check against the second order spectrum peak of the peak at 229.6 nm, which is found at 459.2 nm. This peak is blocked during a chromatographic run by inserting a UV block filter at 360 nm and higher.

During start-up other checks are performed, such as a lamp intensity check. If the check indicates low intensity, a warning message will be displayed indicating a need to change the lamp. The operation time for the mechanics is also logged by the system and thus it will automatically be displayed when it is probable that the mechanical system needs service.

What is claimed is:

1. A method of calibrating an optical system, the system comprising a flash lamp as light source (4), a lens system (6), a monochromator so as to enable scanning essentially monochromatic light over a detection system (14, 16), the light source providing at least two high intensity peaks at distinct wavelengths, the method comprising the following steps:

i) scanning a first wavelength region comprising at least one of said at least two high intensity peaks, and measuring the intensities at a selected number of points during the scan;

ii) coarsely locating said at least two peaks;

iii) scanning a wavelength region around each of said at least two peaks, measuring the intensities at closer intervals than in step i);

iv) locating said at least two peaks by auto correlation; and v) determining the point of location of said peaks as a distance from reference point.

2. The method as claimed in claim 1, wherein said monochromator comprises a grating (10) and a motor (20) causing a displacement of the grating, and wherein said distance corresponds to the displacement of the grating.

3. The method as claimed in claim 1, wherein the measured intensity values are stored in a data array.

4. The method as claimed in claim 3, wherein a plurality of measurements is made for each of said points, the sum of said plurality of values being stored in said data array.

5. The method as claimed in claim 3 or 4, wherein said autocorrelation for locating the respective peaks is performed on the data in said data array.

6. The method as claimed in claim 1, wherein an array point corresponding to a first detected intensity value, lower by a preselected percentage of a highest detected intensity value is taken as a starting point, and wherein said first peak is located by stepping to a data point in said array corresponding to a wave length value 36 nm higher than said point corresponding to said first intensity value above zero.

7. A method of calibrating an optical system, the system comprising a flash light source, a lens system, an entrance slit, a monochromator in the form of a concave reflection grating, a motor for displacing the grating in a pivoting fashion so as to enable scanning essentially monochromatic light over an optical fibre end, the optical fibre being connected to a detection system, the light source providing at least two high intensity peaks at distinct wavelengths, the method comprising the following steps:

scanning a first wavelength region comprising at least one of said at least two high intensity peaks, and measuring the intensities at a selected number of points during the scan;

registering the highest intensity value;

comparing the first detected value above zero with said highest intensity value in order to establish that it does not exceed a predetermined fraction of said highest value;

finding the first value exceeding the value corresponding to said predetermined fraction of said highest value;

locating a first of said at least two peaks, by autocorrelation;

scanning a wavelength region around each of said at least two peaks, measuring the intensities at closer intervals than in the previous scan;

locating said at least two peaks by autocorrelation.

* * * * *